United States Patent
Palavalli et al.

(10) Patent No.: US 10,120,668 B2
(45) Date of Patent: Nov. 6, 2018

(54) OPTIMIZING RESOURCE USAGE AND AUTOMATING A DEVELOPMENT AND OPERATIONS DEPLOYMENT PIPELINE

(71) Applicant: VMWARE, INC., Palo Alto, CA (US)

(72) Inventors: Amarnath Palavalli, Seattle, WA (US); Vishal Jain, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 15/426,074

(22) Filed: Feb. 7, 2017

(65) Prior Publication Data
US 2017/0371636 A1 Dec. 28, 2017

(30) Foreign Application Priority Data
Jun. 27, 2016 (IN) .............................. 201641021952

(51) Int. Cl.
G06F 9/44 (2018.01)
G06F 8/60 (2018.01)
G06F 9/455 (2018.01)
G06F 9/445 (2018.01)

(52) U.S. Cl.
CPC ............ *G06F 8/60* (2013.01); *G06F 9/44578* (2013.01); *G06F 9/45558* (2013.01); *G06F 2009/4557* (2013.01)

(58) Field of Classification Search
CPC ............................... G06F 8/61; G06F 9/45558
USPC ........................................................ 717/177
See application file for complete search history.

(56) References Cited

U.S. PATENT DOCUMENTS

| | | | | |
|---|---|---|---|---|
| 7,577,722 | B1* | 8/2009 | Khandekar | G06F 9/45558 709/220 |
| 9,052,961 | B2* | 6/2015 | Mangtani | G06F 9/5072 |
| 9,110,770 | B1* | 8/2015 | Raju | G06F 8/77 |
| 9,501,303 | B1* | 11/2016 | McBride | G06F 9/45533 |
| 9,514,037 | B1* | 12/2016 | Dow | G06Q 10/06315 |
| 2013/0232463 | A1* | 9/2013 | Nagaraja | G06F 8/61 717/101 |
| 2013/0232497 | A1* | 9/2013 | Jalagam | G06F 9/5072 718/104 |
| 2013/0232498 | A1* | 9/2013 | Mangtani | G06F 9/5072 718/104 |
| 2014/0215464 | A1* | 7/2014 | Birke | G06F 9/45533 718/1 |
| 2015/0334155 | A1* | 11/2015 | Bragstad | H04L 47/805 709/219 |
| 2017/0371636 | A1* | 12/2017 | Palavalli | G06F 9/45558 |

* cited by examiner

*Primary Examiner* — Lewis A Bullock, Jr.
*Assistant Examiner* — Theodore Hebert
(74) *Attorney, Agent, or Firm* — Thomas | Horstemeyer, LLP

(57) ABSTRACT

Methods and systems that automate a DevOps deployment pipeline and optimize DevOps cost are described. Methods generate a deployment pipeline model based on policies associated with each deployment stage and task. Methods optimize cost of the deployment pipeline model based on model combinations of VMs. The deployment pipeline model may be executed on a cloud computing infrastructure in order to develop an application program.

20 Claims, 17 Drawing Sheets

OPTIMIZING RESOURCE USAGE AND AUTOMATING A DEVELOPMENT AND OPERATIONS DEPLOYMENT PIPELINE

RELATED APPLICATIONS

Benefit is claimed under 35 U.S.C. 119(a)-(d) to Foreign Application Serial No. 201641021952 filed in India entitled "METHODS AND SYSTEMS TO OPTIMIZE COST AND AUTOMATE A DEVOPS DEPLOYMENT PIPELINE", on Jun. 27, 2016, by VMware, Inc., which is herein incorporated in its entirety by reference for all purposes.

TECHNICAL FIELD

The present disclosure is directed to automated DevOps ("development and operations") deployment pipeline and optimization of DevOps cost.

BACKGROUND

Enterprises have traditionally viewed application development and information technology ("IT") operations as two separate specialized areas. The development team tested new applications in an isolated development environment for quality assurance ("QA") and if certain development parameters were satisfied, the application was passed to the IT operations team. The operations team would then deploy and maintain the application. However, with this approach, there was usually a long delay between application releases and because the development and operations teams worked separately. The development team was not always aware of operational roadblocks encountered by the IT operations team that would prevent the application from working as originally developed. In recent years, enterprises have moved away from developing their applications in discrete silos of specialization toward a continuous development cycle called DevOps (short for development and operations). DevOps emphasizes collaboration and communication between application development and IT operation terms. DevOps is typically implemented as a deployment pipeline of application development, QA, user acceptance testing ("UAT"), pre-production, and production. As a result, applications are developed more rapidly, more frequently, and with more reliability and increased user satisfaction when compared to traditional application development.

SUMMARY

Methods and systems that automate a DevOps deployment pipeline and optimize DevOps cost are described. Methods generate a deployment pipeline model based on policies associated with each deployment stage and task. Methods then optimize cost of the deployment pipeline model based on model combinations of virtual machines. The deployment pipeline model may be executed on a cloud computing infrastructure in order to develop an application program.

DETAILED DESCRIPTION

Figure 1:
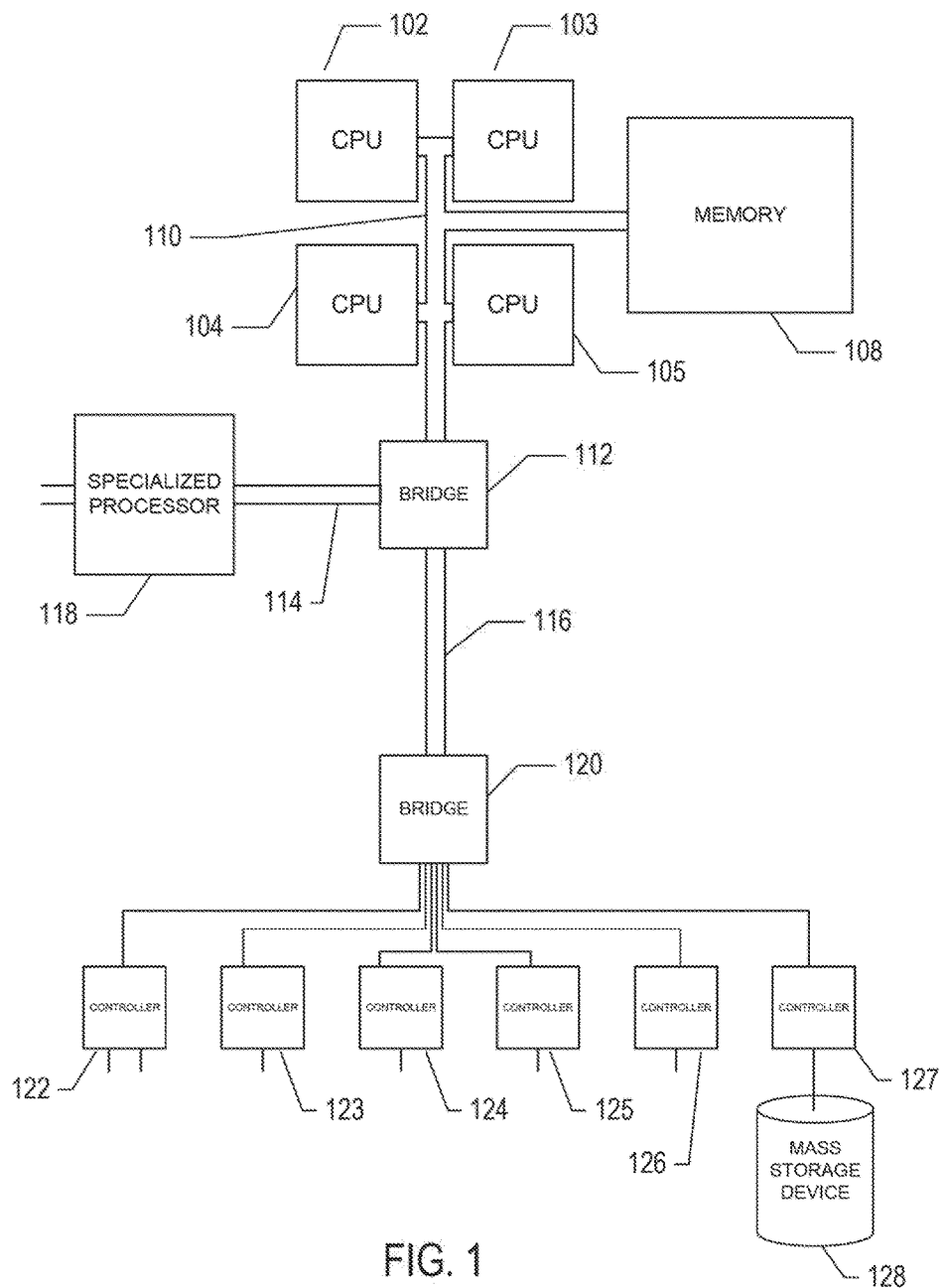
FIG. 1 shows a general architectural diagram for various types of computers.

In a first subsection, computer hardware, complex computational systems, and virtualization are described. Methods and systems that automate DevOps deployment pipeline and optimize DevOps cost are described in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
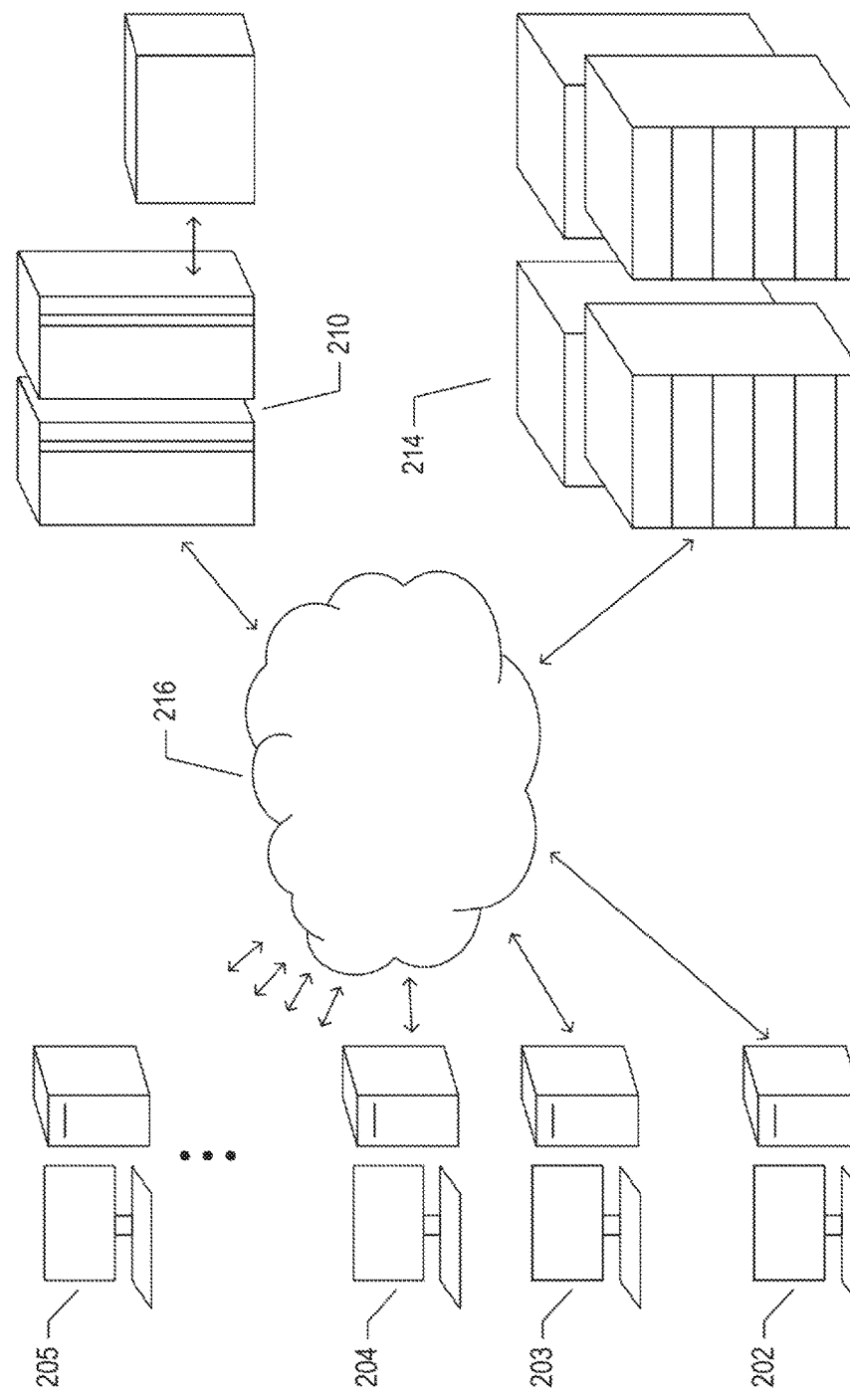
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
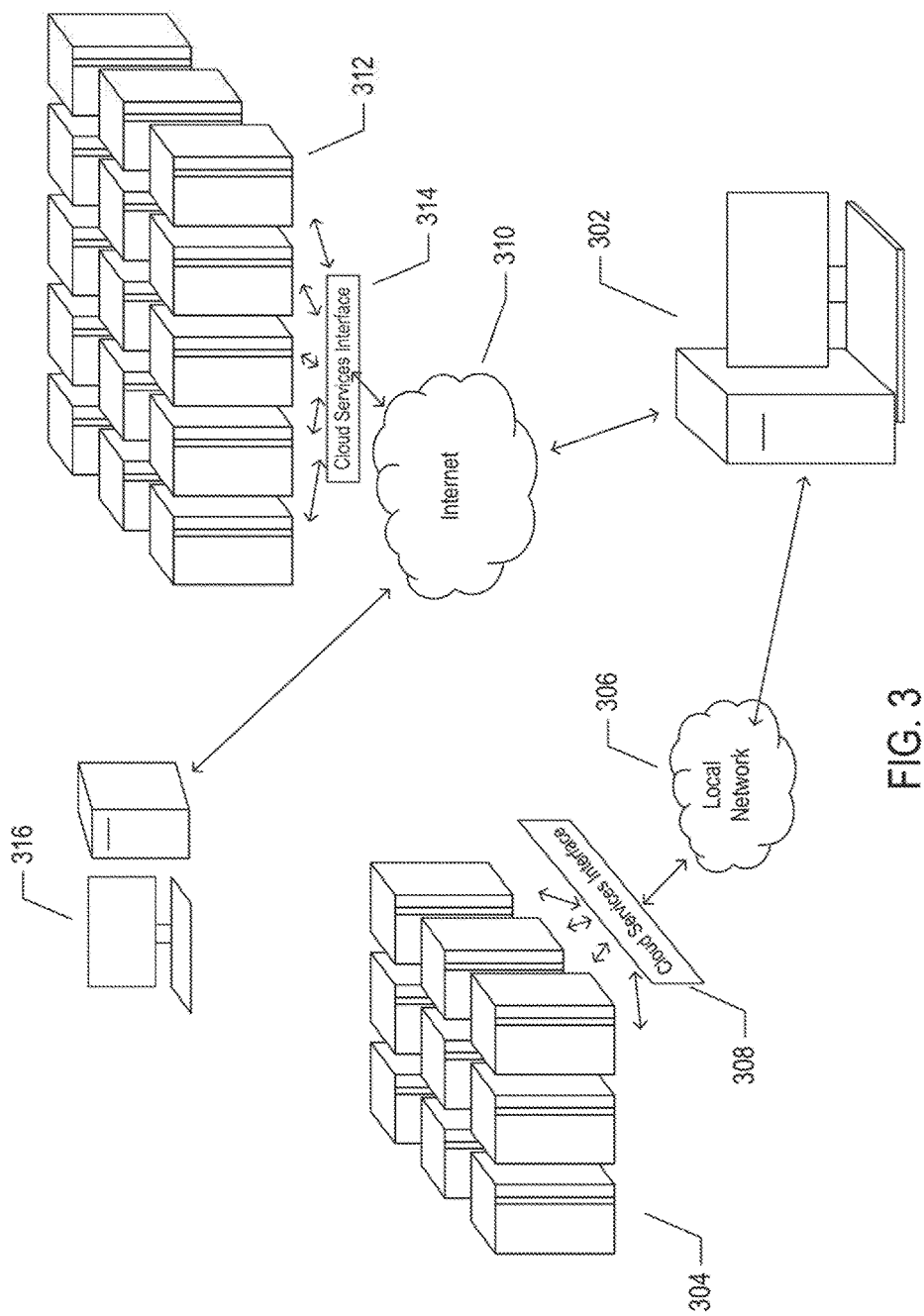
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
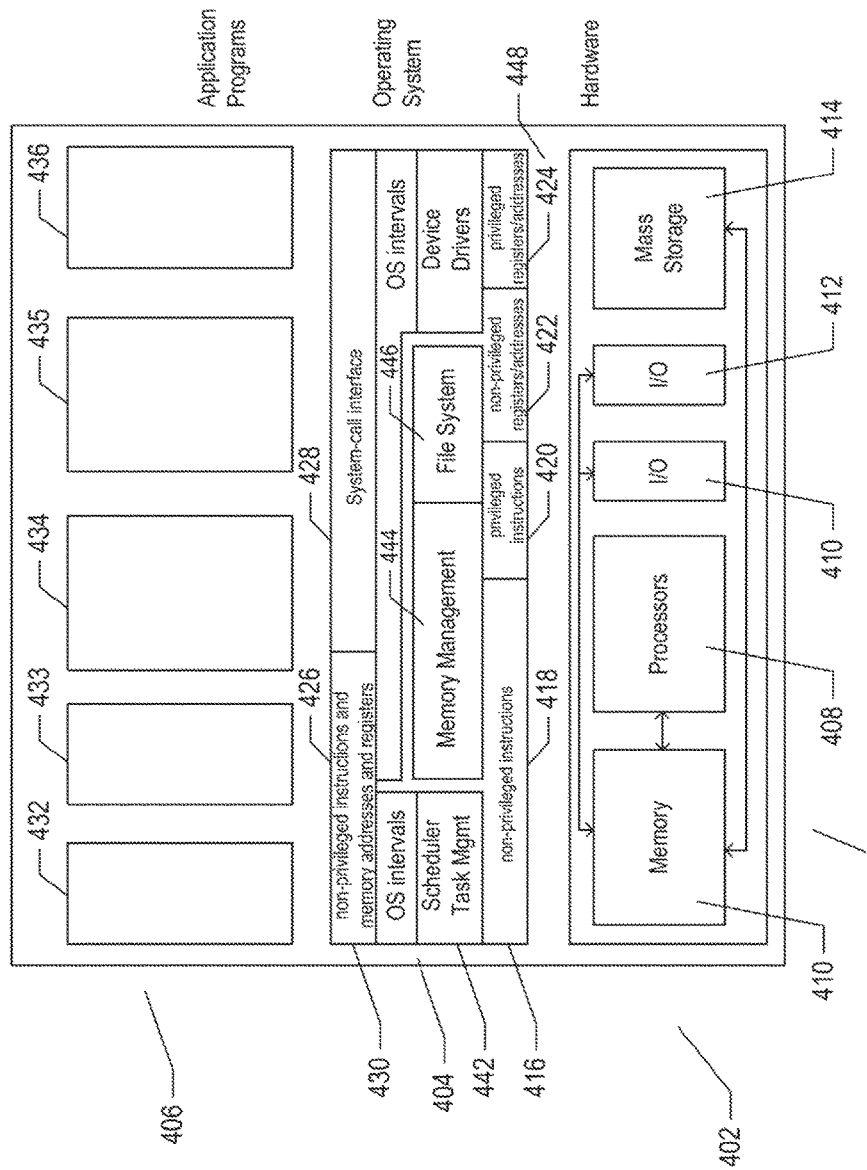
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402 (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways Mat could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
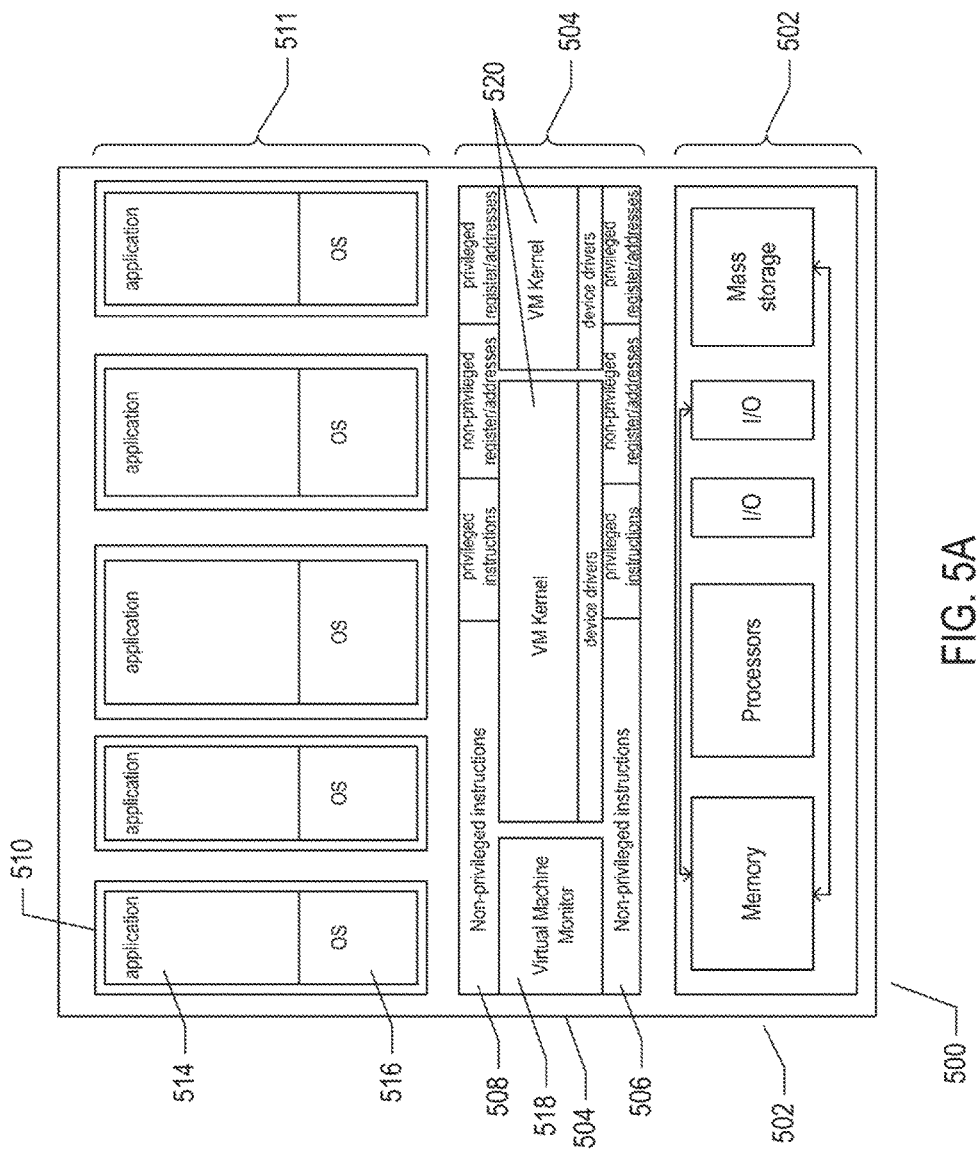
FIGS. 5A-5B show two types of virtual machine and virtual-machine execution environments.
Figure 5B:
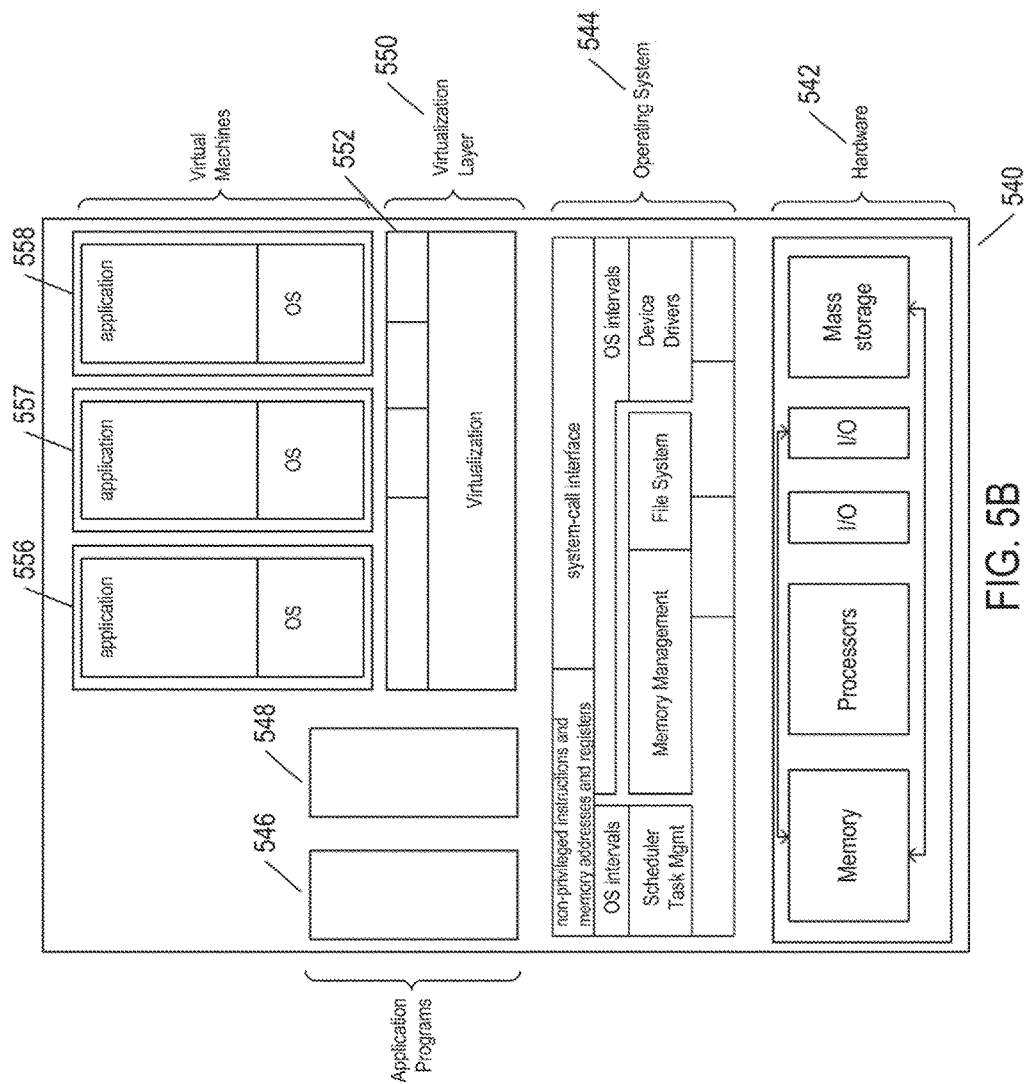

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VW and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMS receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing, VMs ("VM kernel"). The VM kernel, tier example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
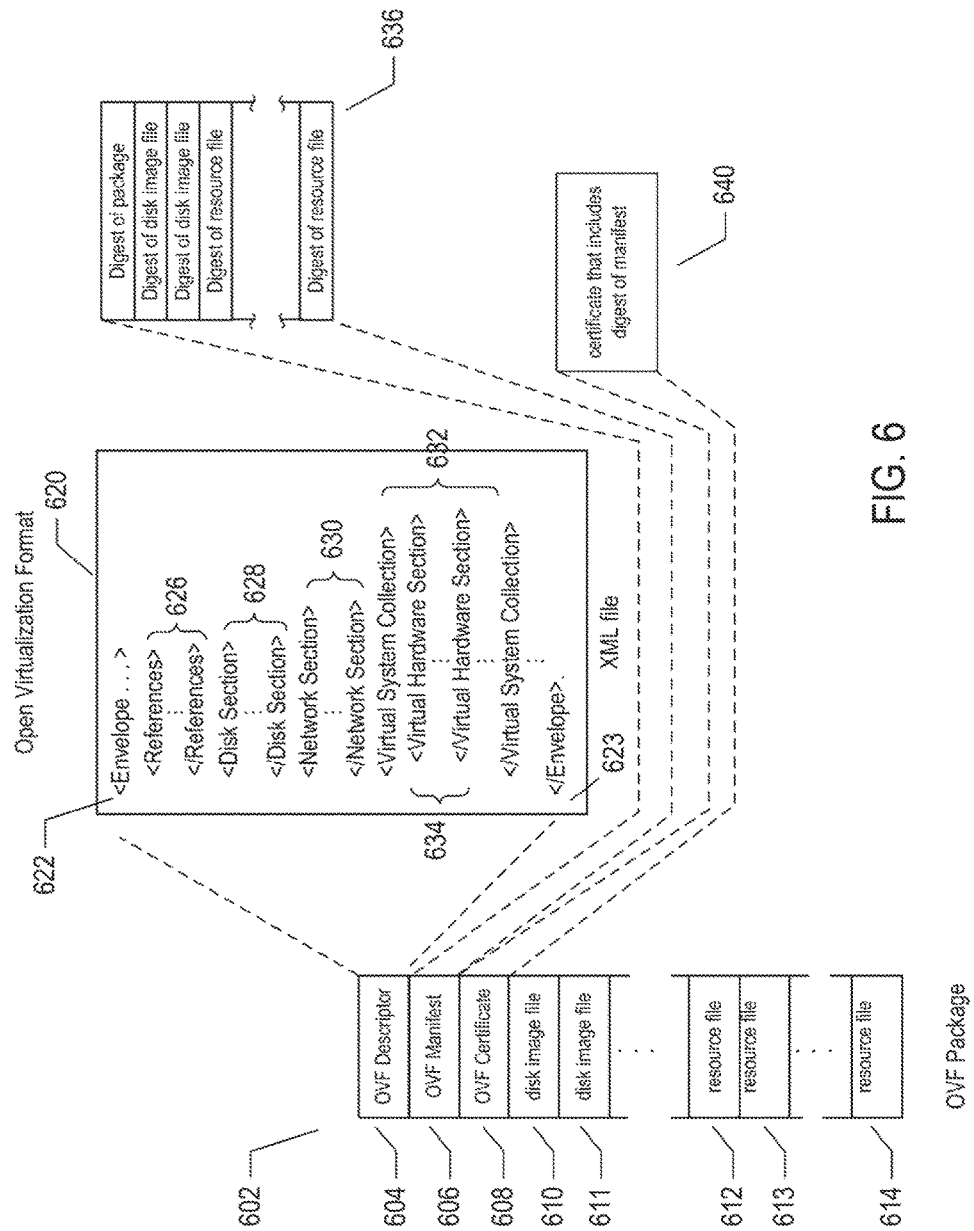
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single the or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual, disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
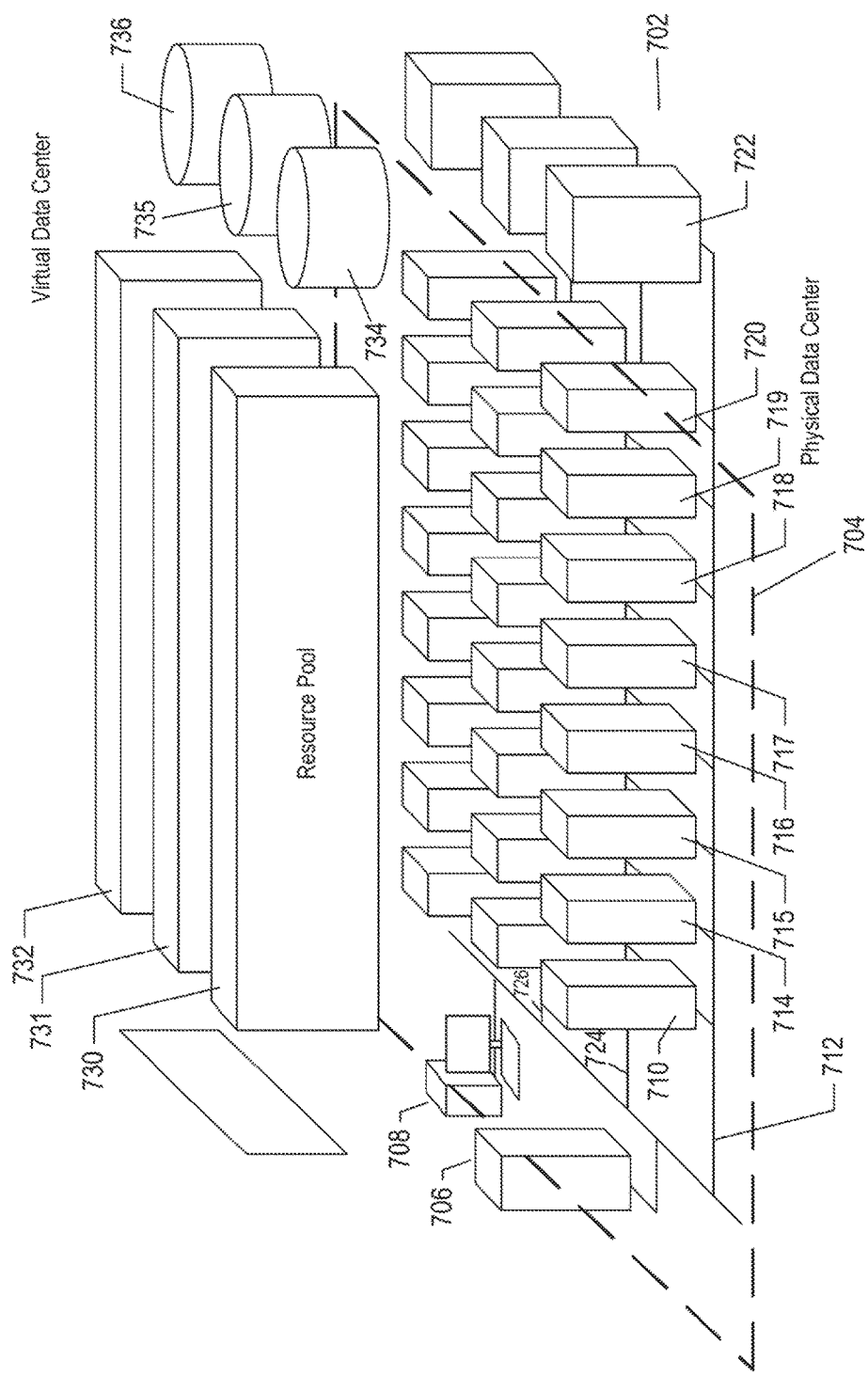
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
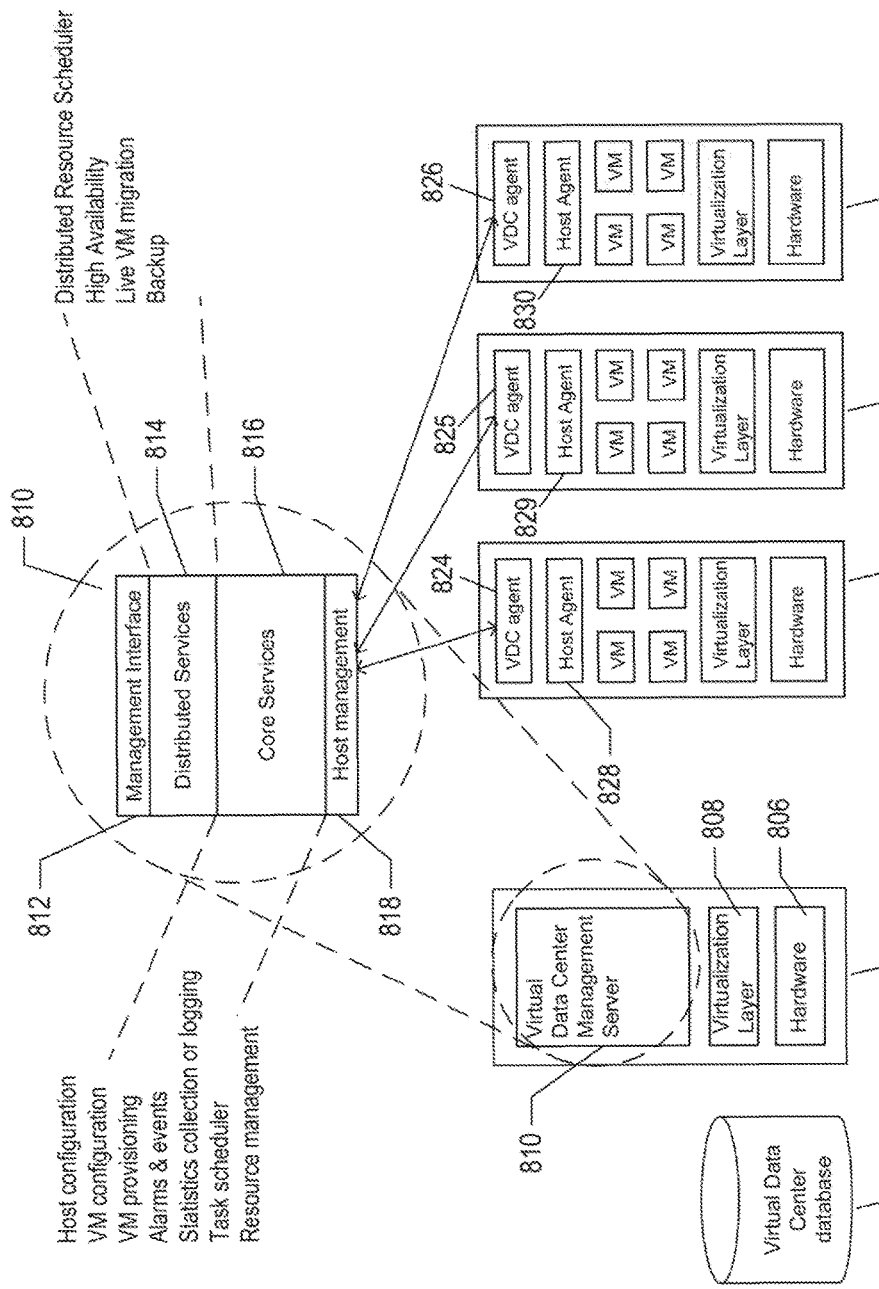
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most electively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or riser to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
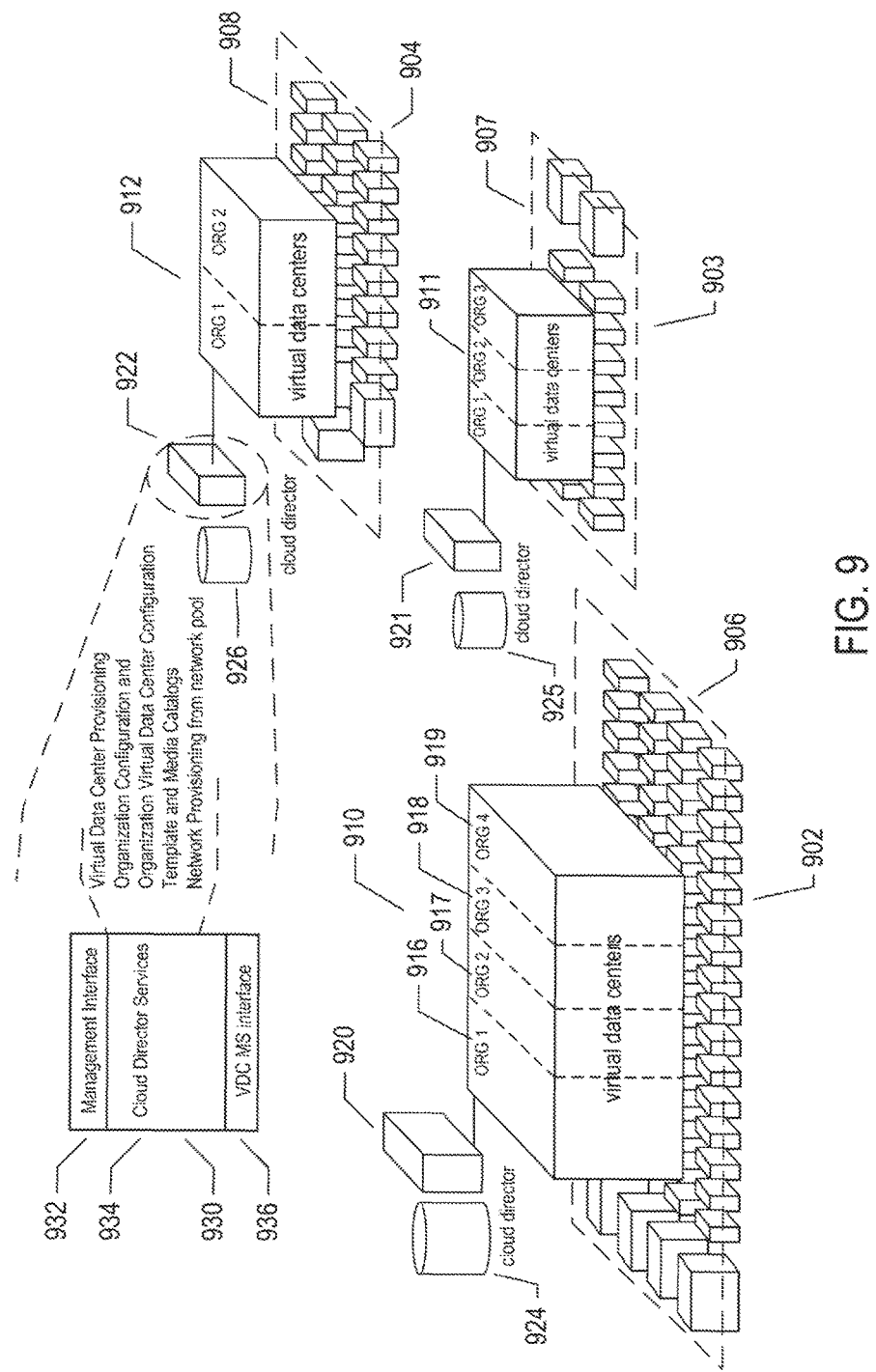
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-theta-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from an network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
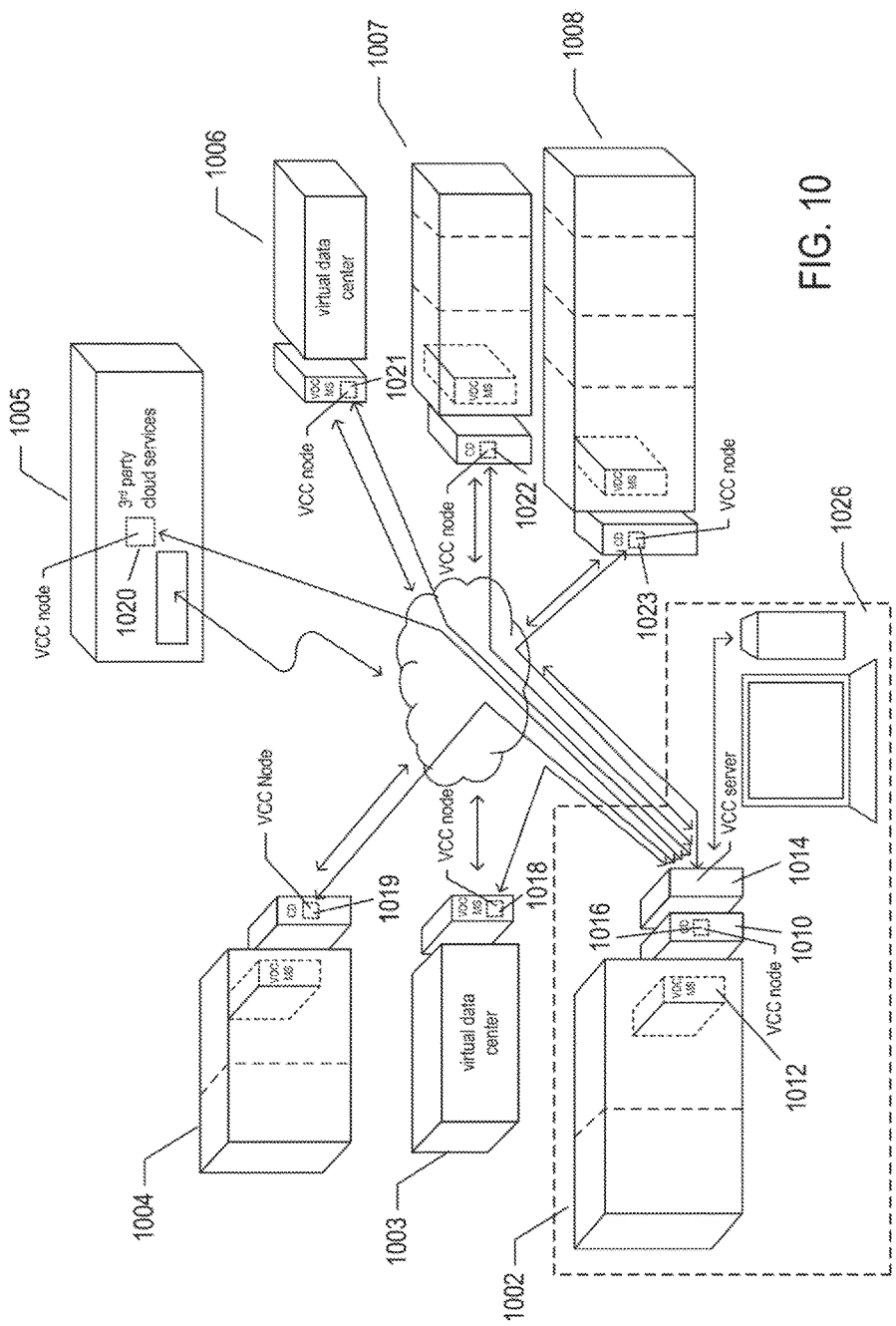
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may he single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
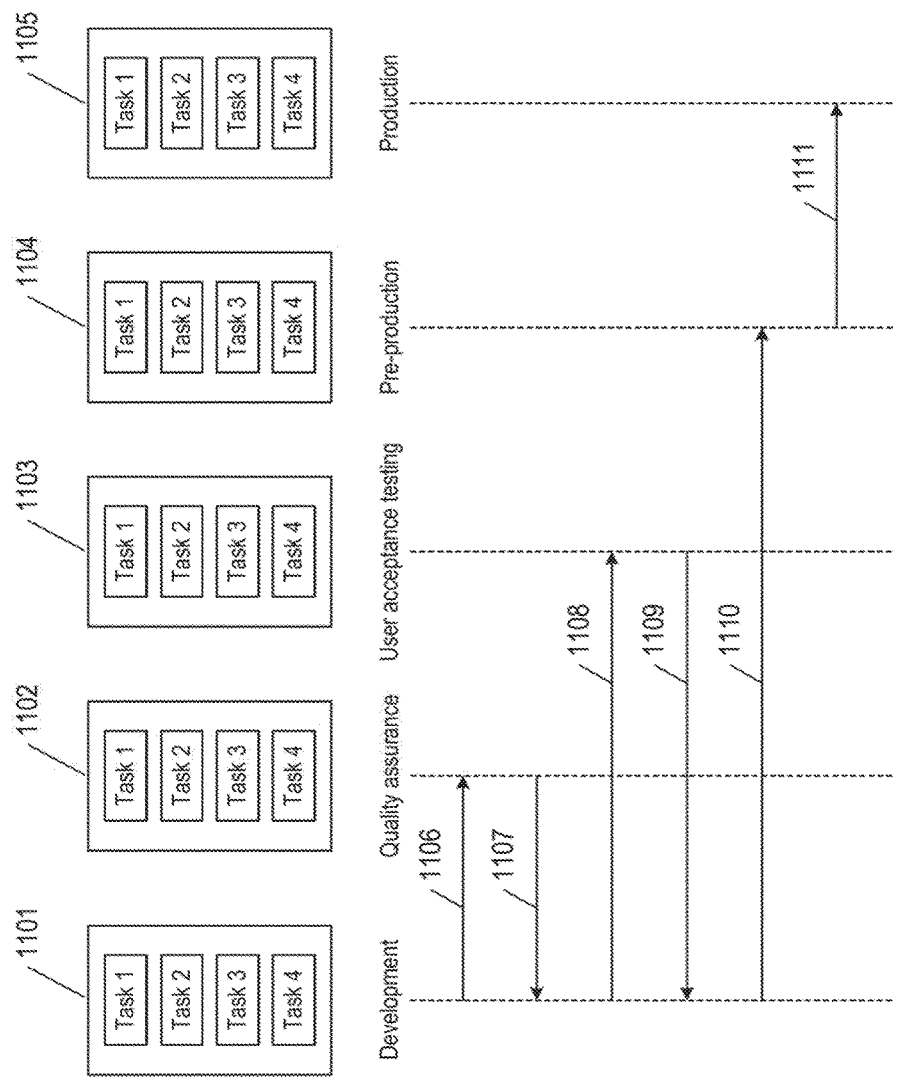
FIG. 11 shows an example of a deployment stages in a DevOps deployment pipeline.

Methods and Systems to Automate DevOps Deployment Pipeline and Optimize DevOps Cost Development and operations ("DevOps") of an application program is carried out in deployment stages of a deployment pipeline. FIG. 11 shows an example of different deployment stages in a DevOps deployment pipeline. In this example, the deployment stages include application development 1101, quality assurance ("QA") 1102, user acceptance testing ("UAT") 1103, pre-production 1104, and production 1105. Directional arrows 1106-1111 represent passage of the application program between different deployment stages of the deployment pipeline. Each deployment stage comprises a number of tasks identified as Task 1, Task 2, Task 3, and Task 4 that are specific to carrying out the deployment stage. Although each deployment stage is shown as being carried out with four associated tasks, in practice, the number of tasks carried out by each deployment stage may range from as few as one task to more than four tasks. Development stage 1101 is the first stage of the deployment pipeline and represents construction of the application program. When development of the application is completed, the application program is passed 1106 to QA 1102. If QA 1102 identifies any bugs or errors in the application program, the application program is passed 1107 back to the development stage 1101 for corrections. The application program may then be passed to UAT 1103, which conducts a series of user tests to determine if the application program performs as expected for users. If UAT 1103 detects any user performance problems, the application program is passed 1109 back to the development stage 1101 for corrections. The application may then be passed 1110 to pre-production 1104 to prepare the application program for full-scale production 1105. The application program is then passed 1111 to production 1105 where the application program is ready for use. Production 1105 is typically the final stage in the deployment pipeline. The deployment pipeline detects issues that may lead to problems in production 105. The deployment pipeline creates collaboration between the various groups that manage each deployment stage in delivering the application program.

A DevOps deployment pipeline may be executed according to deployment policies that are based on resources of the one or more data centers used to execute the deployment pipeline, such as type of server compute, I/O network, storage, and security. Taking this approach one level up, DevOps may be implemented according to a 'Deployment Policy' with respect to the entire deployment pipeline, which in turn may be overridden at the deployment stage level. Each deployment stage and each task of a deployment stage may have one or more associated policies that describes how the stage or task is to be carried out.

Figure 12:
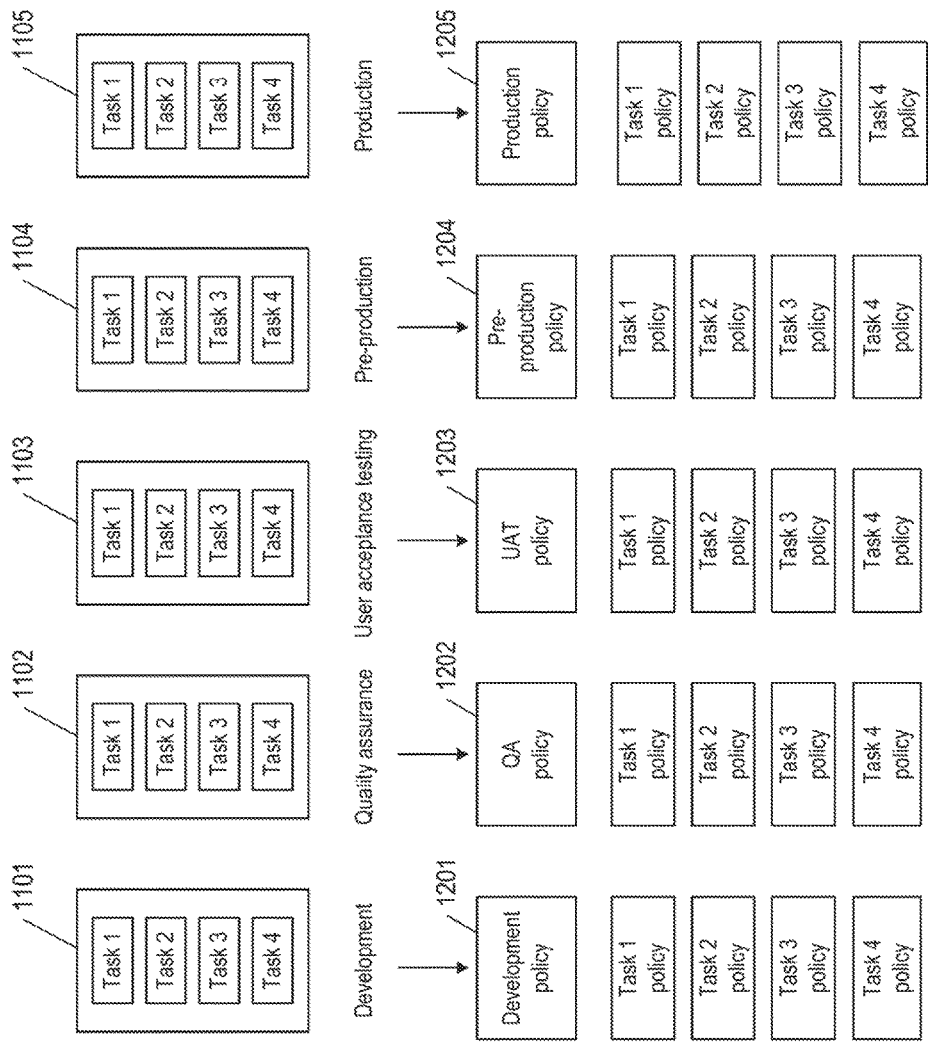
FIG. 12 shows an example of the deployment pipeline shown in FIG. 11 with each stage and task having an associated policy.

FIG. 12 shows an example of the deployment pipeline shown in FIG. 11 with each stage and task having an associated policy. Deployment stages 1101-1105 have corresponding stage policies 1201-1205. Each task of a deployment stage has an associated task policy. Task 1 of development 1101 has an associated Task 1 policy that indicates how Task 1 may be implemented. For example, Task 1 policy may require that Task 1 be executed with a VM or server computer having particular processor speed, memory and network I/O.

An example of deployment policies for a deployment pipeline are provided as follows:
1. Minimize network I/O. Consider executing a complete deployment stage in one data center or cloud provider in order to minimize the network 110, because for some cloud providers, the network I/O cost may be significant compared to computational and storage costs. For example, if an application program has to be uploaded to a server computer then the policy may require that copying over a wide area network be avoided if a server computer is available within a local area network.
2. Ensure use of highest storage tier for the deployment stage 1101 (even if it is the most expensive or increases network I/O due to data transfer across networks).
3. Ensure use of highest computer resources for production stage 1105 level of usage is a key performance metric.
4. Stop the execution of the deployment pipeline when the total cost of the deployment pipeline exceeds cost allocated in a budget for application program development.
5. Mutual exclusion of resources and services. For example, a policy may state that a given VM should be used only for a dedicated deployment pipeline, but may be part of the business needs. A policy may also state that a datastore should not be used for a deployment pipeline due to high latency.
6. Deployment pipeline failover. As part of a disaster recovery policy, if a VM in a deployment pipeline fails, the policy may require replication of the entire deployment pipeline in a new data center and tear down the deployment pipeline in a previous data center.

Each deployment stage may require a specific amount of cloud infrastructure resources, such as compute power, storage, and network I/O. For example, development 1101 may be carried out using low end and low capacity cloud-infrastructure resources because development is typically the most frequently repeated operation of the deployment pipeline. By contrast, production 1105 may be carried out with higher capacity cloud-infrastructure resources based on a service level agreement between organizations and/or user demand. A deployment pipeline model may be input to cost optimization to calculate the cost of running the application program services for a given data center.

An enterprise may use resources from various cloud providers in the form of a VDC, private cloud, hybrid cloud, and a heterogeneous cloud. Private clouds are built fir exclusive use by the enterprise, which provides control of data, security, and quality of service. Private clouds may be built and managed within the facilities of the enterprise or may be hosted externally by a private cloud offering. On the other hand, publically hosted clouds are maintained by a public cloud service provider that offers resources like compute power, network, and storage as a service. One benefit of public clouds is that the resources maintained by a public cloud service provider are typically much larger than the resources maintained in a private cloud. As a result, public cloud services may be scaled up or down based on demand and the enterprise reduces operational risk and cost of having to maintain a private cloud. Hybrid clouds are a combination of public and private cloud models. Hybrid clouds are designed to extend a private cloud with additional resources offered by a public cloud. For example, an enterprise that typically relies on a private cloud may observe a workload spike that requires additional resources provided by a public cloud.

Figure 13:
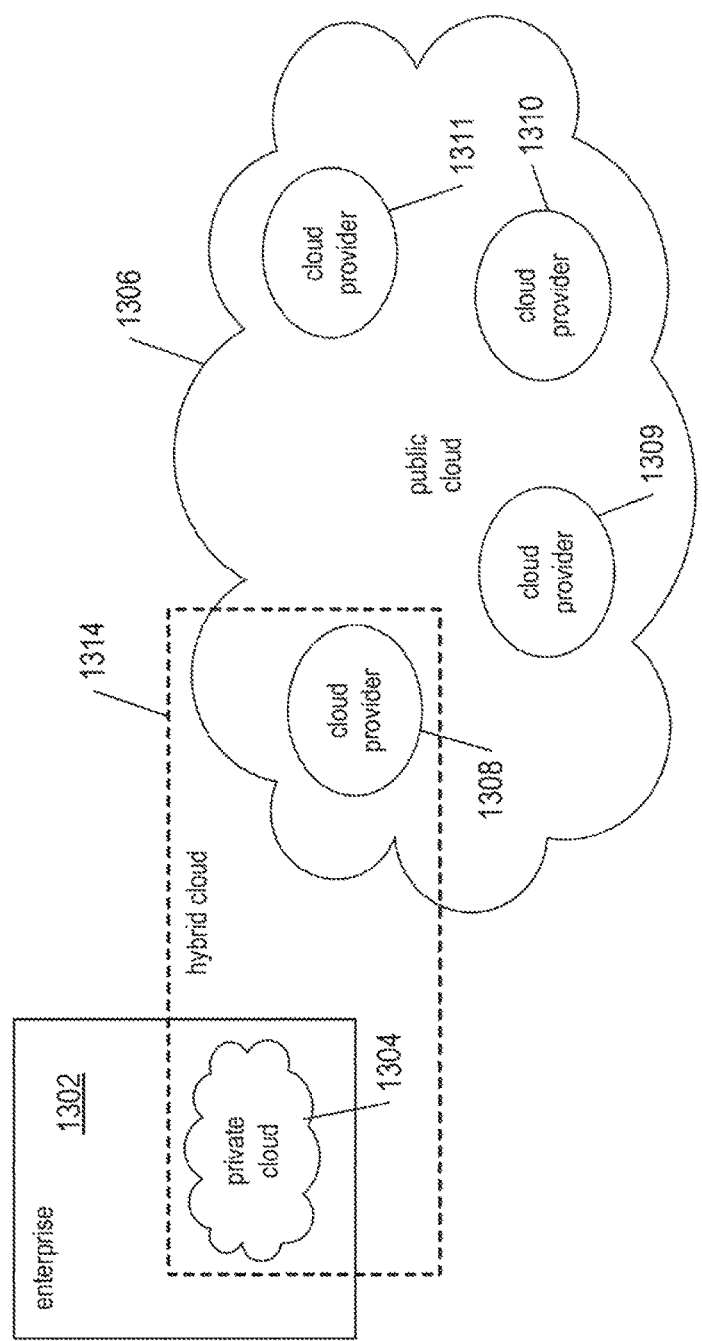
FIG. 13 shows an example of art enterprise 1302 that maintains execution of an application using a private cloud 1304.

FIG. 13 shows an example of an enterprise 1302 that maintains execution of an application using a private cloud 1304. The enterprise 1302 may be a business, an individual, a government agency, a non-profit, or any other organization. The application may be computer software or a computer program. The private cloud 1304 is a cloud infrastructure comprising computers, servers, data-storage devices, an internal network and may also include virtual machines ("VMs") and virtual servers ("VSs") operated solely by the enterprise 1302 to execute the application and may be managed and hosted internally by the enterprise 1302 or may be managed and hosted by a third-party exclusively for the enterprise 1302. FIG. 13 also shows a representation of a public cloud 106 with various public cloud provides 1308-1311 managed by public cloud service providers. Each public cloud service provider maintains a cloud infrastructure of computers, servers, data-storage devices, an internal network, VMs, and VSs over a network that is open for public use. Typically, public cloud service providers own and maintain the cloud infrastructure and offer access to computing services over the Internet It may be the case that the enterprise 1302 lacks sufficient computational resources to execute the application entirely within the private cloud 1304. In such cases, the enterprise 1302 may consider using a hybrid cloud model in which the application runs in the private cloud 1304 and is also run in one or more of the public cloud services 1308-1311. For example, as shown in FIG. 13, a hybrid cloud 1314 is formed from the private cloud 1304 and the public clouds services provided by a public cloud service provider 1308 to execute the same application. A primary advantage of forming a hybrid cloud is that the enterprise 1302 only pays for extra compute services when needed. The enterprise 1302 may use the private cloud 1304 to support typical computational workloads but forms a hybrid cloud 1314 using cloud resources offered by a public cloud service provider during temporary spikes or increase in processing demands.

Public clouds are typically implemented as homogeneous clouds or heterogeneous clouds. A homogeneous cloud comprises a homogeneous set of commodity hardware, with details of the hardware obscured by virtualization technology. By contrast, a heterogeneous cloud comprises a heterogeneous set of resources, such as different accelerators, variety of server computer architectures, and different network interconnects. Examples of heterogeneous cloud architectures include digital signal processors, network packet processors, graphical processing units ("GPUs"), general purpose GPUs, symmetrical multiprocessors, and conventional CPUs. Because heterogeneous clouds provide specialized devices that can be optimized for specific kinds of computations, heterogeneous clouds can increase efficiency, lower power consumption, and reduced costs when compared to homogeneous clouds.

Figure 14:
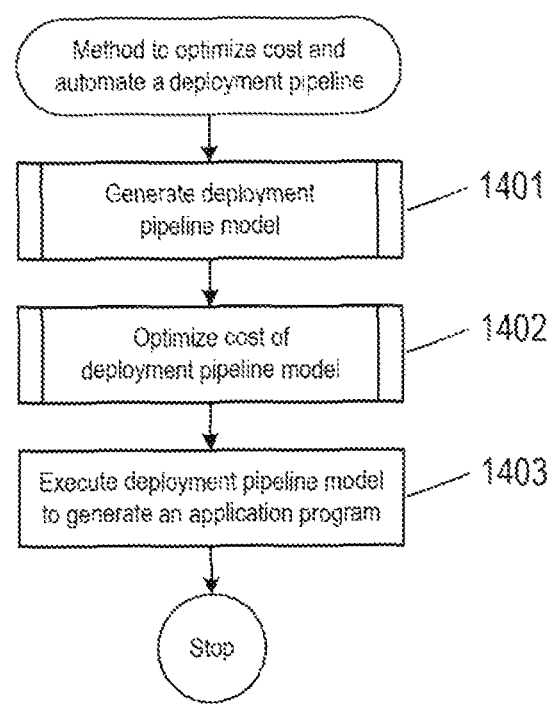
FIG. 14 shows a control-flow diagram of a method to optimize cost and automate a DevOps deployment pipeline.

FIG. 14 shows a control-flow diagram of a method to optimize cost and automate a DevOps deployment pipeline. In block 1401, a routine "generate deployment pipeline model" is called to generate a deployment pipeline model that can be used to develop and release an application program. In block 1402, a routine "optimize cost of deployment pipeline model" is called to optimize cost of executing deployment pipeline model. In block 1403, executing the optimized deployment pipeline model to develop the application program.

Figure 15:
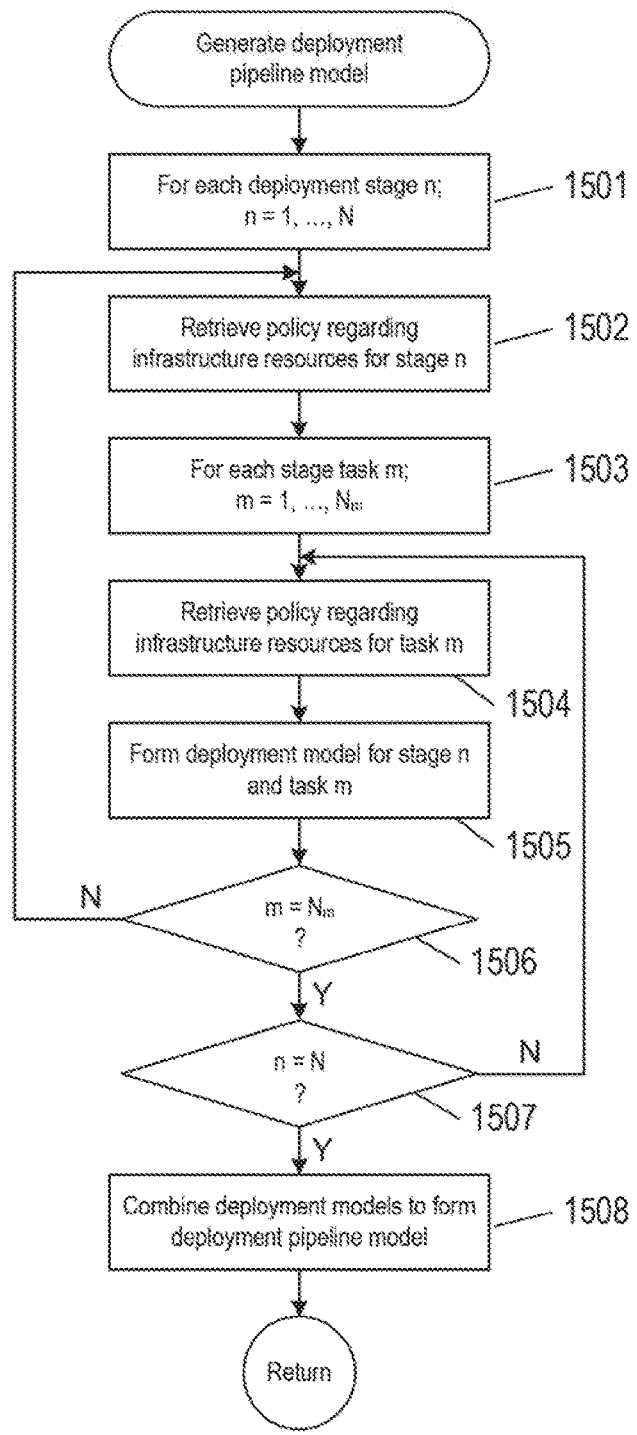
FIG. 15 shows a control-flow diagram of the routine "generate deployment pipeline model" called in block 1401 of FIG. 14.

FIG. 15 shows a control-flow diagram of the routine "generate deployment pipeline model" called in block 1401 of FIG. 14A. A for-loop beginning with block 1501 repeats the operations represented by blocks 1502-1507 for N different deployment stages. In block 1502, a development stage policy that describes resources to execute a deployment stage of the deployment pipeline is retrieved from storage. A for-loop beginning with block 1503 repeats the operations represented by blocks 1504-1506 for $N_m$ different tasks of the n-th deployment stage. In block 1503, a task policy that describes resources to execute a task of the deployment stage is retrieved from storage. In block 1504, a deployment model for the stage and tack is formed from the separate task policies and the deployment stage policy. In decision block 1506, the operations represented by blocks 1502-1505 are repeated until m=$N_m$. In decision block 1507, the operations represented by blocks 1504-1506 are repeated until n=N.

Figure 16:
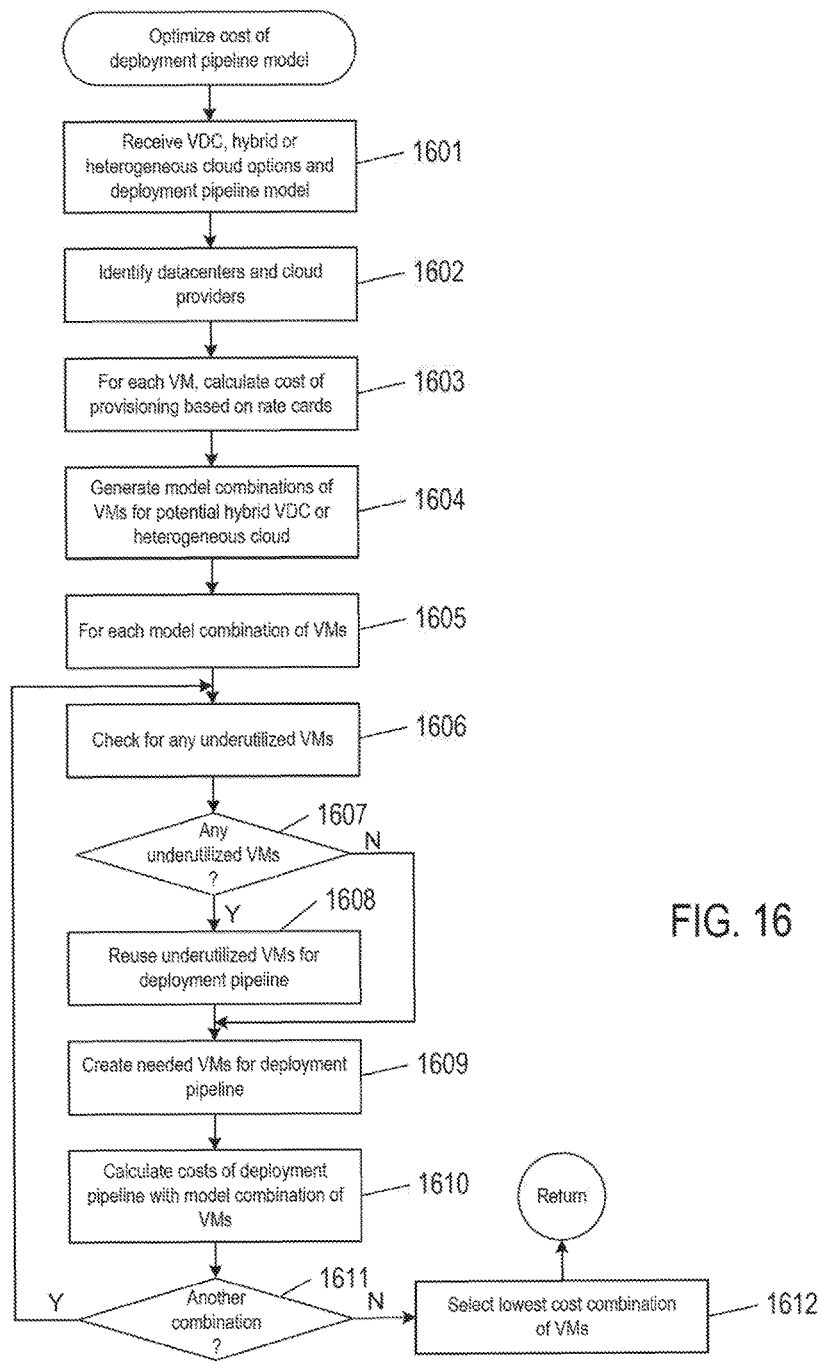
FIG. 16 shows a control-flow diagram of the routine "optimize cost of deployment pipeline model" called in block 1402 of FIG. 14.

FIG. 16 shows a control-flow diagram of the routine "optimize cost of deployment pipeline model" called in block 1402 of FIG. 14. In block 1601, VDC, hybrid cloud, heterogeneous cloud options are received and the deployment pipeline model generated in block 1401 is received. In block 1602, data centers and cloud providers that match the hybrid cloud and heterogeneous cloud options are identified. In block 1603, for each VM in the hybrid and heterogeneous clouds and VDC, the cost of provisioning the VMs is calculated based on a rate card. In block 1604, possible model combinations of VMs for a potential hybrid cloud, VDC or heterogeneous cloud are generated. A for-loop beginning with block 1605, repeats the operations represented by blocks 1606-1611 for each possible model combination of VMs. In block 1606, check for any underutilized VMs in the hybrid and heterogeneous clouds and VDC. In decision block 1607, if there are any underutilized VMs, control flows to block 1608. For example, there may be VMs or services already running and resource utilization is low (e.g., <30%). In block 1608, such VMs may be reused for VMs of the deployment pipeline and services may be deployed on the underutilized VMs. Any conflicts such as ports on which various applications running may be addressed by configuration of the services based on an application blueprint from which the VM is created. In block 1609, any VMs that are not identified as being underutilized may be created for the deployment pipeline. In block 1610, costs of deployment pipeline for the VM combination is calculated. In decision block 1611, another possible combination of VMs is considered. In block 1612, a lowest cost combination of the VMs is selected.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

What is claimed is:

1. A computer-implemented method to optimize resource usage and automate a deployment pipeline that generates an application program, the computer-implemented method comprising:
    generating a deployment pipeline model comprising a plurality of deployment stages by:
        for each of the deployment stages, retrieving a development stage policy that describes resources to execute a respective one of the deployment stages;
        for each task of the respective one of the deployment stages, retrieving a task policy that describes resources to execute the task;
        generating a deployment model for the respective one of the deployment stages and the task based on the development stage policy and the task policy; and
        forming the deployment pipeline model by combining the deployment model generated for each of the deployment stages and the task;
    optimizing a cost of the deployment pipeline model by:

generating a plurality of model combinations of virtual machines for potential execution of the deployment pipeline model;

for each of the model combinations of virtual machines:

identifying existing ones of the virtual machines that are able to be utilized and new virtual machines that are required to be created for the deployment pipeline model; and determining a cost for a respective one of the model combinations based at least in part on the existing ones of the virtual machines that are able to be utilized and the new virtual machines that are required to be created for the deployment pipeline model; and executing the deployment pipeline model on one of the model combinations of virtual machines having a lowest cost in a cloud computing infrastructure to generate and deploy the application program.

2. The computer-implemented method of claim 1, wherein optimizing cost of the deployment pipeline model further comprises:

for each of the model combinations of virtual machines, identifying underutilized virtual machines in the cloud computing infrastructure;

reusing the underutilized virtual machines to execute computational operations of the deployment pipeline model; and creating new virtual machines to execute computational operations of the deployment pipeline model.

3. The computer-implemented method of claim 1, wherein at least a portion of the model combinations of virtual machines comprise a hybrid cloud option, a virtual data center (VDC) option, and a heterogeneous cloud option.

4. The computer-implemented method of claim 1, wherein the existing ones of the virtual machines that are able to be utilized are identified as virtual machines already running and having a low resource utilization.

5. The computer-implemented method of claim 1, wherein:

the stage policies describe at least a first resource required to execute the deployment stages of the deployment pipeline;

the task policies describe at least a second resource required to execute the tasks required to be performed in the deployment stages; and the first resource and the second resource are selected from a group consisting of: a processor speed, memory, and a network input/output (I/O) capacity.

6. The computer-implemented method of claim 1, wherein the deployment pipeline model is generated or optimized using the stage policies and the task policies to perform at least one of: (1) minimizing network input/output (I/O) operations; (2) ensuring use of a highest storage tier for the deployment stage; and (3) ensuring use of a highest computer resource for a product stage of the deployment stages.

7. The computer-implemented method of claim 1, wherein the deployment stages comprise at least one of:

a development stage having a development policy and plurality of development tasks to be performed in the development stage, individual ones of the development tasks having a development task policy;

a quality assurance stage having a quality assurance policy and plurality of quality assurance tasks to be performed in the quality assurance stage, individual ones of the quality assurance tasks having a quality assurance task policy;

a user acceptance testing stage having a user acceptance testing policy and plurality of user acceptance testing tasks to be performed in the user acceptance testing stage, individual ones of the user acceptance testing tasks having a user acceptance testing task policy;

a pre-production stage having a pre-production policy and plurality of pre-production tasks to be performed in the pre-production stage, individual ones of the pre-production tasks having a pre-production task policy; and a production stage having a production policy and plurality of production tasks to be performed in the production stage, individual ones of the production tasks having a production task policy.

8. The computer-implemented method of claim 1, wherein the deployment pipeline model is generated or optimized using the stage policies and the task policies to perform at least one of: (1) stopping execution of the deployment pipeline when a total cost of the deployment pipeline exceeds a predefined threshold for application program development; (2) performing mutual exclusion of resources and services; and (3) implementing a deployment pipeline failover.

9. A system to optimize resource usage and automate a deployment pipeline that generates an application program, the system comprising:

at least one computing device comprising memory and at least one hardware processor; and program instructions stored in the memory and executable by the at least one computing device that, when executed, direct the at least one computing device to:

generate a deployment pipeline model comprising a plurality of deployment stages by:

for each of the deployment stages, retrieving a development stage policy that describes resources to execute a respective one of the deployment stages;

for each task of the respective one of the deployment stages, retrieving a task policy that describes resources to execute the task;

generating a deployment model for the respective one of the deployment stages and the task based on the development stage policy and the task policy; and forming the deployment pipeline model by combining the deployment model generated for each of the deployment stages and the task;

optimize a cost of the deployment pipeline model by:

generating a plurality of model combinations of virtual machines for potential execution of the deployment pipeline model;

for each of the model combinations of virtual machines:

identifying existing ones of the virtual machines that are able to be utilized and new virtual machines that are required to be created for the deployment pipeline model; and determining a cost for a respective one of the model combinations based at least in part on the existing ones of the virtual machines that are able to be utilized and the new virtual machines that are required to be created for the deployment pipeline model; and execute the deployment pipeline model on one of the model combinations of virtual machines having a lowest cost in a cloud computing infrastructure to generate and deploy the application program.

10. The system of claim 9, wherein optimizing the cost of the deployment pipeline model further comprises:
for each of the model combinations of virtual machines, identifying underutilized virtual machines in the cloud computing infrastructure;
reusing the underutilized virtual machines to execute computational operations of the deployment pipeline model; and
creating new virtual machines to execute computational operations of the deployment pipeline model.

11. The system of claim 9, wherein at least a portion of the model combinations of virtual machines comprise a hybrid cloud option, a virtual data center (VDC) option, and a heterogeneous cloud option.

12. The system of claim 9, wherein the existing ones of the virtual machines that are able to be utilized are identified as virtual machines already running and having a low resource utilization.

13. The system of claim 9, wherein:
the stage policies describe at least a first resource required to execute the deployment stages of the deployment pipeline;
the task policies describe at least a second resource required to execute the tasks required to be performed in the deployment stages; and
the first resource and the second resource are selected from a group consisting of: a processor speed, memory, and a network input/output (I/O) capacity.

14. The system of claim 9, wherein the deployment pipeline model is generated or optimized using the stage policies and the task policies to perform at least one of: (1) minimizing network input/output (I/O) operations; (2) ensuring use of a highest storage tier for the deployment stage; and (3) ensuring use of a highest computer resource for a product stage of the deployment stages.

15. The system of claim 9, wherein the deployment stages comprise at least one of:
a development stage having a development policy and plurality of development tasks to be performed in the development stage, individual ones of the development tasks having a development task policy;
a quality assurance stage having a quality assurance policy and plurality of quality assurance tasks to be performed in the quality assurance stage, individual ones of the quality assurance tasks having a quality assurance task policy;
a user acceptance testing stage having a user acceptance testing policy and plurality of user acceptance testing tasks to be performed in the user acceptance testing stage, individual ones of the user acceptance testing tasks having a user acceptance testing task policy;
a pre-production stage having a pre-production policy and plurality of pre-production tasks to be performed in the pre-production stage, individual ones of the pre-production tasks having a pre-production task policy; and
a production stage having a production policy and plurality of production tasks to be performed in the production stage, individual ones of the production tasks having a production task policy.

16. The system of claim 9, wherein the deployment pipeline model is generated or optimized using the stage policies and the task policies to perform at least one of: (1) stopping execution of the deployment pipeline when a total cost of the deployment pipeline exceeds a predefined threshold for application program development; (2) performing mutual exclusion of resources and services; and (3) implementing a deployment pipeline failover.

17. A non-transitory computer-readable medium for optimizing resource usage and automating a deployment pipeline that generates an application program encoded with machine-readable instructions that, when executed by at least one computing device, direct the at least one computing device to:
generate a deployment pipeline model comprising a plurality of deployment stages by:
for each of the deployment stages, retrieving a development stage policy that describes resources to execute a respective one of the deployment stages;
for each task of the respective one of the deployment stages, retrieving a task policy that describes resources to execute the task;
generating a deployment model for the respective one of the deployment stages and the task based on the development stage policy and the task policy; and
forming the deployment pipeline model by combining the deployment model generated for each of the deployment stages and the task;
optimize a cost of the deployment pipeline model by:
generating a plurality of model combinations of virtual machines for potential execution of the deployment pipeline model;
for each of the model combinations of virtual machines:
identifying existing ones of the virtual machines that are able to be utilized and new virtual machines that are required to be created for the deployment pipeline model; and
determining a cost for a respective one of the model combinations based at least in part on the existing ones of the virtual machines that are able to be utilized and the new virtual machines that are required to be created for the deployment pipeline model; and
execute the deployment pipeline model on one of the model combinations of virtual machines having a lowest cost in a cloud computing infrastructure to generate and deploy the application program.

18. The non-transitory computer-readable medium of claim 17, wherein optimizing the cost of the deployment pipeline model further comprises:
for each of the model combinations of virtual machines, identifying underutilized virtual machines in the cloud computing infrastructure;
reusing the underutilized virtual machines to execute computational operations of the deployment pipeline model; and
creating new virtual machines to execute computational operations of the deployment pipeline model.

19. The non-transitory computer-readable medium of claim 17, wherein the deployment pipeline model is generated or optimized using the stage policies and the task policies to perform at least one of: (1) minimizing network input/output (I/O) operations; (2) ensuring use of a highest storage tier for the deployment stage; and (3) ensuring use of a highest computer resource for a product stage of the deployment stages.

20. The non-transitory computer-readable medium of claim 17, wherein the deployment pipeline model is generated or optimized using the stage policies and the task policies to perform at least one of: (1) stopping execution of the deployment pipeline when a total cost of the deployment pipeline exceeds a predefined threshold for application program development; (2) performing mutual exclusion of resources and services; and (3) implementing a deployment pipeline failover.

\* \* \* \* \*